April 14, 1925.  1,533,127
H. MASBRUCH
ATTACHMENT FOR A LAWN MOWER
Filed June 28, 1922
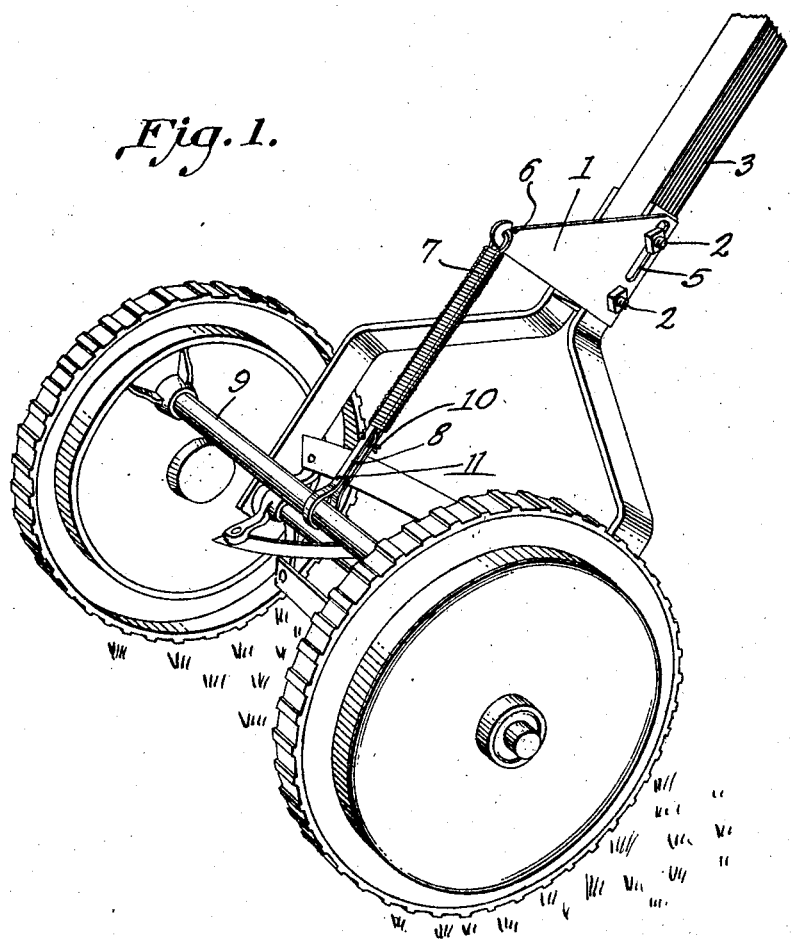
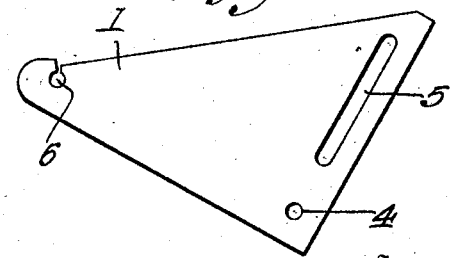
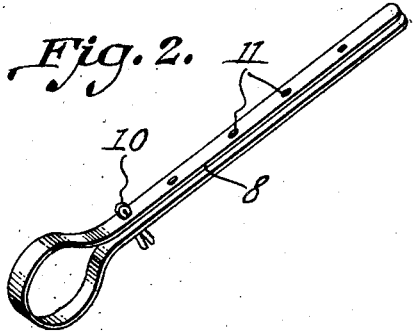
Inventor
Henry Masbruch
By
Attorney Patented Apr. 14, 1925.

1,533,127

UNITED STATES PATENT OFFICE.

HENRY MASBRUCH, OF PLATTEVILLE, WISCONSIN.

ATTACHMENT FOR A LAWN MOWER.

Application filed June 28, 1922. Serial No. 571,401.

*To all whom it may concern:*

Be it known that I, HENRY MASBRUCH, a citizen of the United States, residing at Platteville, in the county of Grant and State of Wisconsin, have invented a new and useful Attachment for a Lawn Mower, of which the following is a specification.

The object of my attachment is to provide a device which will make the lawn mower run more steadily and without the usual amount of vibration.

I attain this and other objects of my invention by the mechanism illustrated in the accompanying drawings, in which—

Figure 1 is a perspective view of my invention applied to a lawn mower;

Fig. 2 is a detailed perspective view of member 8; and

Fig. 3 is a detailed side view of member 1.

Like numerals indicate like parts in each of the several views.

Referring to the accompanying drawings, I provide an approximately triangular plate 1, having suitable openings 4 and 5 to receive the bolts 2 for adjusting the plate to the handle of a lawn mower. Opening 5 is in the form of a slot in order to permit of the device being attached to various sizes of lawn mowers where the upper bolt might come in a different position. The tapered end of plate 1 is provided with a slot 6, to which is hooked the spring 7 which is adjustably attached to strap 8 by suitable means, such as cotter pin 10, which may be inserted in any of the openings 11, according to the degree of tension to be placed on spring 7. The looped portion of strap 8 is engaged over the cross rod 9 of the lawn mower, as shown in Fig. 1.

The attachment fastens onto the bolts already on the handle of the lawn mower and no extra fastenings are needed. In operation, the device tends to keep the lawn mower running steadily and prevents it humping up as lawn mowers frequently do.

The adjustment is intended for use on lawn mowers of the type having a fixed blade to cooperate with the rotating cutting reel.

It is within the contemplation of the inventor to provide a device which will either exert tension upward, as with the device illustrated in Fig. 1, or exert tension in a reverse direction to obtain substantially the same result; namely, to take up vibration and to keep the blades of the lawn mower down in proper operative position while in use in heavy grass.

What I claim is:

1. An attachment for a lawn mower having a cross rod and a handle, said attachment consisting of a strap for engaging the said cross rod, a spring attached to said strap, a bracket plate connected to said handle, said plate having a plurality of openings, one of said openings being in the form of a slot to permit of its being attached to various sizes of lawn mowers.

2. An attachment for a lawn mower having a cross rod and a handle and handle base therefor, said attachment, consisting of a looped strap, the loop portion of which engages the cross rod, a spring attached to said strap, a bracket plate to which the spring is attached, said plate having a plurality of openings, one of said openings being in the form of a slot, to permit of its being attached to various sizes of lawn mowers, and bolts for attaching the bracket plate and also the original lawn mower handle base to the lower end of the lawn mower handle.

3. An attachment for a lawn mower having a cross rod and a handle and handle base therefor, said attachment, consisting of a looped strap, the loop portion of which engages the cross rod, a spring attached to said strap, means for adjustably attaching the spring to the strap, a bracket plate to which the spring is attached, said plate having a plurality of openings, one of said openings being in the form of a slot, to permit of its being attached to various sizes of lawn mowers, and bolts for attaching the bracket plate and also the original lawn mower handle base to the lower end of the lawn mower handle.

HENRY MASBRUCH.